J. F. MORGAL.
CUTTING WIRE SUPPORT FOR BRICK MACHINES.
APPLICATION FILED SEPT. 16, 1912.
1,066,434.
Patented July 1, 1913.
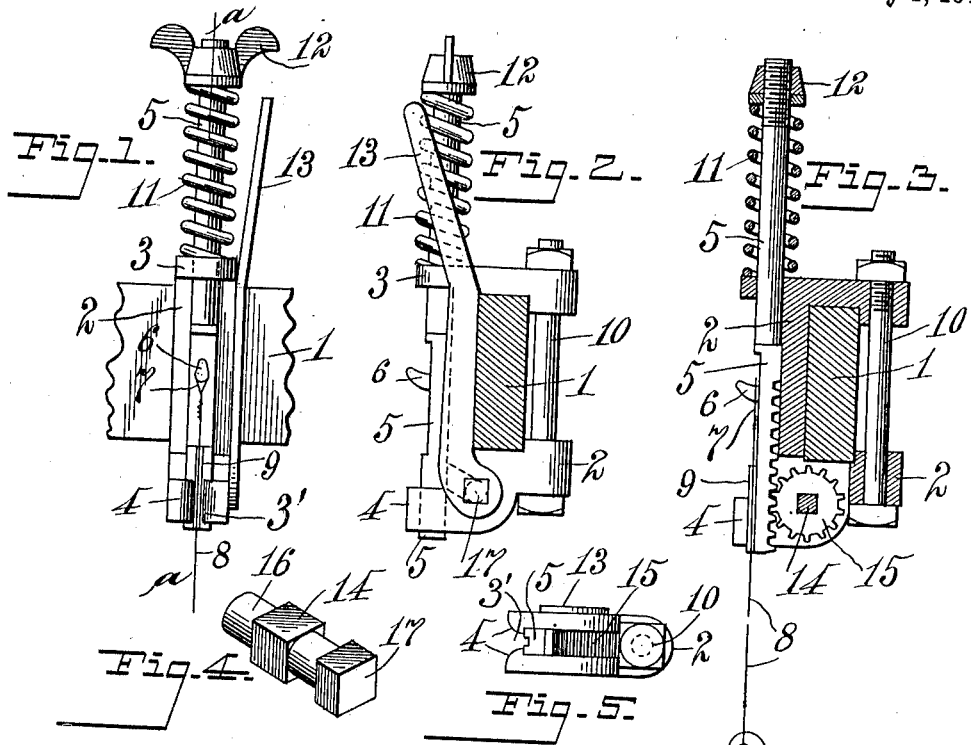
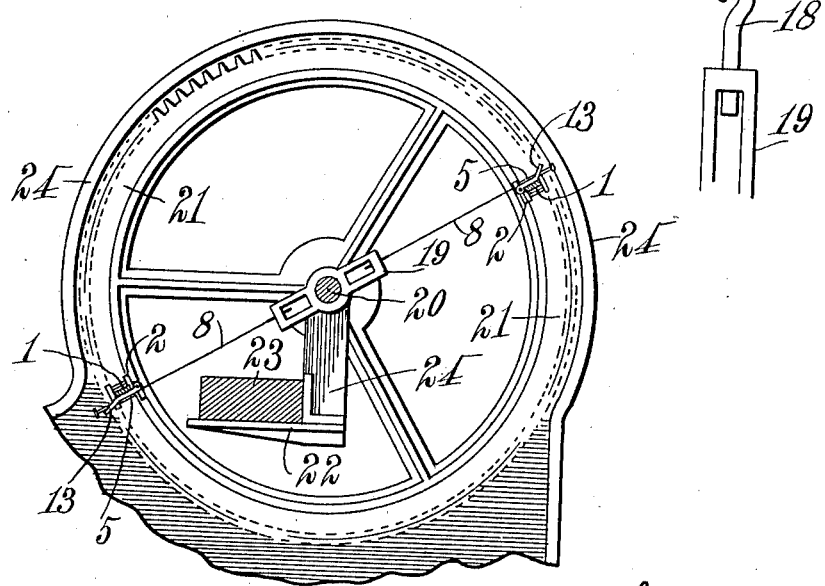
Witnesses
M. Kubler
M. Galloway
Inventor
Jno. F. Morgal
by R. J. McCarty
his Attorney

UNITED STATES PATENT OFFICE.

JOHN F. MORGAL, OF DAYTON, OHIO, ASSIGNOR TO THE C. W. RAYMOND CO., OF DAYTON, OHIO.

CUTTING-WIRE SUPPORT FOR BRICK-MACHINES.

1,066,434. Specification of Letters Patent. Patented July 1, 1913.

Application filed September 16, 1912. Serial No. 720,506.

*To all whom it may concern:*

Be it known that I, JOHN F. MORGAL, citizen of the United States, residing at Dayton, in the county of Montgomery and State of Ohio, have invented certain new and useful Improvements in Cutting-Wire Supports for Brick-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cutting wire supports for brick machines.

The object of the invention is to provide a device of this type which is simple in construction and efficient in operation.

Another object of the invention is to provide means whereby the cutting wires may be placed on the cutting reel without subjecting them to undue strain and which will hold said wires taut when so placed.

Preceding a detail description of the invention, reference is made in general terms to the accompanying drawings of which—

Figure 1 is a front elevation of one of the cutting wires and supports; Fig. 2 is a side elevation of the same; Fig. 3 is a section on the line *a—a* of Fig. 1; Fig. 4 is a detail view of the shaft for the wire support; Fig. 5 is a bottom plan view of Fig. 3; Fig. 6 is a side elevation of the cutting reel, the shaft and clay bar being shown in section and part of the frame broken away.

In the detail description, similar reference characters indicate corresponding parts.

I have not deemed it necessary to include in the present illustrations any more of the machine construction than is necessary to aid an understanding of the improvements which may be attached to and form part of any well known type of brick cutting machine having a rotating cutting reel. The reel which carries the cutting wires, consists of side rings 21, which are joined by cross rods 1. The rings 21 rotate upon side frames 24 which features are of well known construction. The reel is rotated through the agency of gear teeth on the outer periphery of the rings 21. The cutting wires 8, carried by the reel, are adapted to sever individual bricks from a clay bar 23 supported on a series of platens 22 extending from a shaft 20 supported between said frames 24. The cutting wires 8 at their inner ends are fixed to revolving wire holders 19 which turn on the shaft 20, and at their outer ends they are connected to the toothed rings 21 by the following means: The cutting wires 8 are attached to cross rods 1 through means of frames 2 and bolts 10. The frames 2 are provided with bearings 3 and 3′ which receive sliding rack bolts 5 provided with hooks 6 each of which receives the loop end 7 of a cutting wire 8. The opposite ends of said wires are attached to the revolving supports 19 as before stated by means of hooks 18. Each wire is held taut by a coil spring 11 inclosing the bolt 5 between the bearing 3 and thumb nut 12 on said bolt. Each bolt 5 has also provided a groove 9 adapted to receive a cutting wire 8 and thereby forming a support for the outer end of the same. The lower bearings 3′ are recessed as at 4 to permit the wires to be placed in the grooves 9. The sliding racks or bolts 5 are shifted against the tensions of the springs 11 by pinions 15 which are in mesh with the racks of said bolts. The pinions 15 are mounted on square portions 14 of shafts 16 journaled in the frames 2. The shafts 16 are also provided with square portions 17 which receive crank handles 13. When any one of said crank handles 13 is actuated, its pinion 15 will shift the accompanying bolt 5 and thus reduce the distance between the hooks 6 and 18, thereby permitting the cutting wires to be easily placed in position on said hooks and in their respective positions on the reel. When any one of the crank handles 13 is released, the spring 11 will, by expanding, tighten said wire, the tautness of which may be regulated by the thumb screw 12.

The cutting wires of brick machines are subject to severe strain and often to breakage when passing through the clay bar, and when being placed in position and subjected to the necessarily and comparatively high tension under which they are required to be maintained. In the present case, however, the slidable racks 5 will, under the tension of their springs 11, exert a direct pull on the wires, when being placed in position, which will obviate any twisting or side strains with their damaging effect.

Having described my invention, I claim,

In a device of the type specified, a frame, a sliding member provided with a rack portion and a supporting groove mounted in said frame, a spring controlling said sliding member, a pinion in engagement with said rack portion, a shaft journaled in said frame and upon which said pinion is mounted, a lever mounted on said shaft and adapted to actuate said sliding member against the tension of said spring, a cutting wire lying in said groove and supported thereby and in axial alinement with the sliding member, means carried by said sliding member and adapted to receive one end of said cutting wire, and means for supporting the other end of said wire.

In testimony whereof I affix my signature, in presence of two witnesses.

JOHN F. MORGAL.

Witnesses:
R. J. McCARTY,
MATTHEW SIEBLER.

Copies of this patent may be obtained for five cents each, by addressing the "Commissioner of Patents, Washington, D. C."